July 28, 1953  J. G. HALD ET AL  2,647,145
TETRAETHYLTHIURAM DISULFIDE DERIVATIVES
Filed Sept. 2, 1949  2 Sheets—Sheet 1

Inventors
Jens G. Hald, Inger G. Gad &
Sidney A. V. Deans

By [signature]
Attorney

July 28, 1953 — J. G. HALD ET AL — 2,647,145
TETRAETHYLTHIURAM DISULFIDE DERIVATIVES
Filed Sept. 2, 1949 — 2 Sheets—Sheet 2
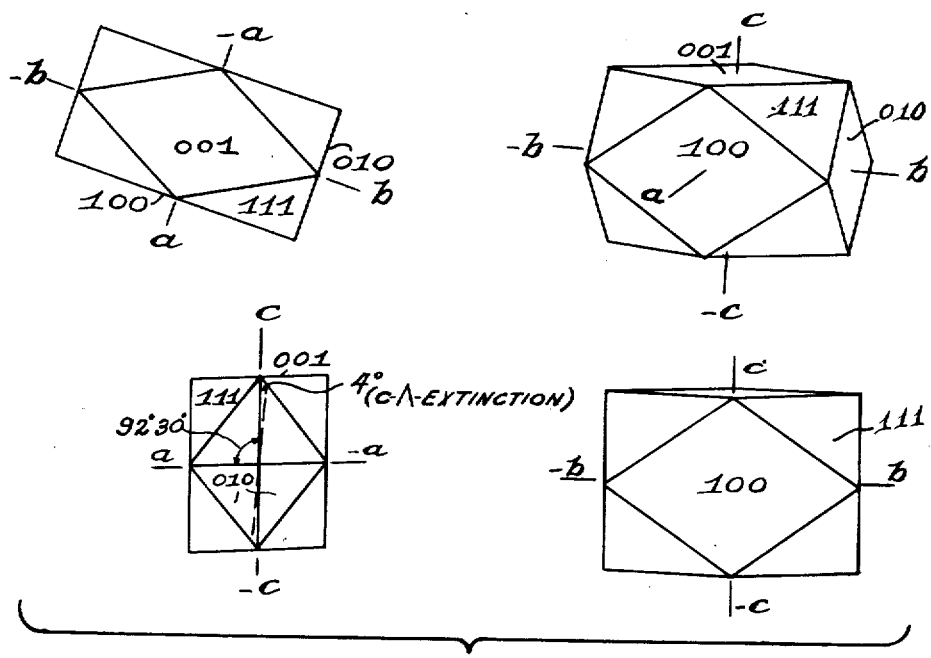
Fig. 5
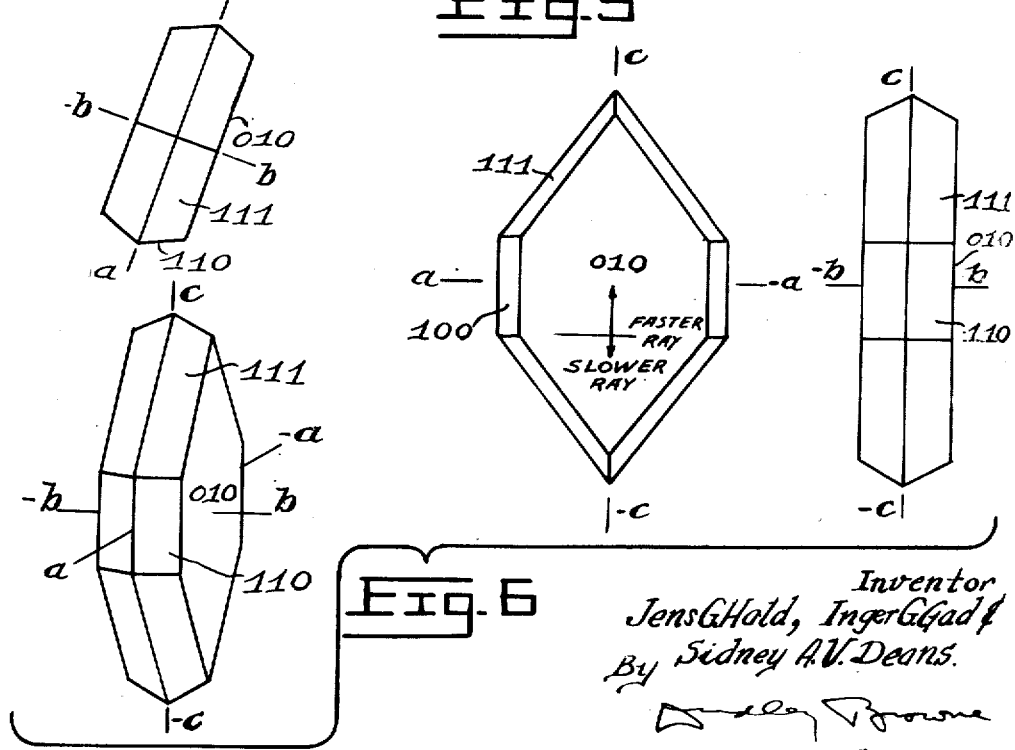
Fig. 6
Inventor
Jens G. Hald, Inger G. Gad
By Sidney A. V. Deans
Attorney Patented July 28, 1953

2,647,145

UNITED STATES PATENT OFFICE 2,647,145

TETRAETHYLTHIURAM DISULFIDE DERIVATIVES

Jens Gunnar Hald and Inger Grete Gad, Copenhagen, Denmark, and Sidney Alfred Vindin Deans, Rosemount, Montreal, Canada, assignors to Ayerst, McKenna & Harrison, Limited, St. Laurent, Quebec, Canada, a corporation of Canada Application September 2, 1949, Serial No. 113,726
In Denmark January 5, 1949

9 Claims. (Cl. 260—567)

INTRODUCTION

This invention relates to tetraethylthiuram disulphide and more particularly to new physical forms of this compound.

Tetraethylthiuram disulphide is a well-known compound which has been used widely as a rubber accelerator and for other purposes. Ordinary crystalline tetraethylthiuram disulphide is a hard, translucent, non-porous, crystalline substance whose optical properties are easily determined by means of a petrographic microscope. It is optically anisotropic showing extreme birefringence (0.15), extreme dispersion ($v>r$), extinction at an angle of 4° to the "c" crystallographic axis, a negative optic sign, an optic axial angle of $2V=80°$ plus, and refractive indices of $X=1.63$, $Y=1.71$ and $Z=1.78$.

Certain new uses of tetraethylthiuram disulphide, particularly as a pharmaceutical product for the treatment of individuals addicted to alcohol, have made it desirable to have the compound available in a more highly purified and finely divided form. It is also desirable to have a means by which the degree of subdivision of the product may be controlled within certain limits so as to achieve a uniformity of properties from one batch to the next.

APPLICANTS' DEVELOPMENT

The applicants have discovered that pseudomorphs of tetraethylthiuram disulphide can be prepared and that such pseudomorphs have properties not possessed by crystalline tetraethylthiuram disulphide.

A pseudomorph is produced according to the invention by allowing one mole of ordinary crystalline tetraethylthiuram disulphide to react with two moles of a carbon tetrahalide and subsequently removing the carbon tetrahalide from the complex so formed. The pseudomorph, so derived, consists of white, opaque, highly porous, friable aggregates of minute crystals and may be referred to as a cryptocrystalline solid. Each aggregate has an external form which would assign it to the orthorhombic system, but the minute crystals constituting the aggregate belong to the monoclinic system since they exhibit the same X-ray diffraction pattern as ordinary monoclinic crystalline tetraethylthiuram disulphide. The minute crystals possess a highly uniform and readily reproducible size approaching molecular dimensions and are unattainable by ordinary crystallization and comminution procedures. The highly porous, friable aggregates of such minute crystals possess a larger surface area than ordinary non-porous tetraethylthiuram disulphide of a similar particle size. Such properties confer upon the pseudomorph a higher rate of solution in various media and consequently a higher and more uniform rate of absorption in the intestinal tract than ordinary tetraethylthiuram disulphide.

PROCESS

Preferably the pseudomorphs are prepared by the combination of one molecule of tetraethylthiuram disulphide and two molecules of carbon tetrahalide to yield substances with the general empirical formula $((C_2H_5)_2NCS_2-)_2.2CX_4$, where X refers to any halogen atom, and by removal of carbon tetrahalide from $((C_2H_5)_2NCS_2-)_2.2CX_4$ to yield pseudomorphs of tetraethylthiuram disulphide after $((C_2H_5)_2NCS_2-)_2.2CX_4$.

Although a reaction takes place between one mole of tetraethylthiuram disulphide and two moles of carbon tetrahalide, an excess of either reactant may be used. When less than two moles of carbon tetrahalide is employed, a mixture of crystalline tetraethylthiuram disulphide and $((C_2H_5)_2NCS_2-)_2.2CX_4$ is formed. When an excess of carbon tetrahalide is employed, a mixture of $((C_2H_5)_2NCS_2-)_2.2CX_4$ and carbon tetrahalide results.

The reaction may be carried out in a variety of reaction media. In particular, methanol, ethanol, n-propanol, isopropanol, n-butanol, sec-butanol, t-butanol, n-amyl alcohol, sec-amyl alcohol, t-amyl alcohol, n-hexanol, acetone, ether, dioxane, chloroform, ethylene dichloride, trichloroethylene, hexane, benzene, and ethyl acetate may be cited. Mixtures of these media may also be used. In the preparation of

an excess of carbon tetrachloride may be used as the reaction medium.

One method of effecting the reaction is to heat one mole of tetraethylthiuram disulphide with two moles of carbon tetrahalide until a homogeneous reaction mixture is formed followed by cooling of the resulting mixture to form crystalline $((C_2H_5)_2NCS_2-)_2.2CX_4$. The

may be converted into pseudomorphs of tetraethylthiuram disulphide by removal of the carbon tetrahalide. The carbon tetrahalide may be removed by the application of heat and vacuum. Thus, in the case of $((C_2H_5)_2NCS_2-)_2.2CBr_4$ a temperature of 60° C. and a pressure of about 0.02 mm. of mercury is satisfactory. In the case of $((C_2H_5)_2NCS_2-)_2.2CCl_4$, on the other hand, exposure to the air at atmospheric pressure and any temperature up to the melting point yields the corresponding pseudomorph of tetraethylthiuram disulphide.

Another method of effecting the reaction is to mix a solution of tetraethylthiuram disulphide with a solution of the carbon tetrahalide followed by cooling of the reaction mixture or evaporation of some of the solvent to obtain crystals of $((C_2H_5)_2NCS_2-)_2.2CX_4$. In the case of $$((C_2H_5)_2NCS_2-)_2.2CCl_4$$

it is sufficient to mix tetraethylthiuram disulphide and excess carbon tetrachloride followed by cooling of the reaction mixture or evaporation of the carbon tetrachloride to yield crystalline $$((C_2H_5)_2NCS_2-)_2.2CCl_4$$

The concentration of the interacting solutions may be varied over a wide range, the upper limit being determined by the solubility of the reactants at a given temperature. In general, the more concentrated the interacting solutions, the greater is the yield of the first crop of $$((C_2H_5)_2NCS_2-)_2.2CX_4$$

the more rapid is the crystallization of the product and the smaller the crystal size.

With highly concentrated solutions of reactants, the product separates in the form of a solid cake of small crystals in practically quantitative yield. With dilute solutions of reactants, the product separates in the form of large crystals. Removal of the first crop followed by concentration of the mother liquors yields a second crop.

The temperature of the reaction mixture may range from the temperature at which the reaction begins to the decomposition point of the reaction mixture. These temperatures depend on such factors as the reaction medium employed and the concentrations of the various reactants. The preferred temperature for effecting the reaction is that at which the reactants dissolve completely in the various reaction media.

On mixing the reactants, it is desirable to employ some form of agitation such as stirring in order to obtain a homogeneous reaction mixture. Stirring may also be employed during the course of the crystallization and/or after the crystallization of $((C_2H_5)_2NCS_2-)_2.2CX_4$ in order to break up any clusters of crystals and if necessary to reduce the crystal size.

The rate of cooling of the reaction mixture may be varied either by applying external cooling or by adding the reaction mixture with stirring to a cold liquid such as water. The more rapid the rate of cooling, the smaller is the crystal size. In order to obtain a maximum yield of product, the reaction mixture may be cooled if desired to any temperature above its freezing point.

Although most of the products generally separate in the first crop of crystals, other crops may be obtained by concentrating the mother liquors either at atmospheric pressure or under vacuum at a temperature sufficiently low to avoid decomposition of the product.

EXAMPLES—PHOTOGRAPHS

The invention will be illustrated in more detail by the following examples and photographs which are intended to illustrate certain specific products and procedures included within the bounds of the invention claimed and are not to be considered in a limiting sense.

*Example I*

In a test tube was placed 10 cc. of ethanol, 0.2 g. of tetraethylthiuram disulphide and 0.7 g. of carbon tetrabromide (M. P. 92–93° C.) The mixture was heated with stirring until the reactants had dissolved completely. On cooling the solution to room temperature, yellow translucent crystals separated from the reaction medium. The product weighed 0.5 g. and melted at 103–106° C. Determination of the bromine content of the product indicated 67.3% bromine, the theoretical value for $((C_2H_5)_2NCS_2-)_2.2CBr_4$ being 66.7%. The product was stable at room temperature and atmospheric pressure.

On heating $((C_2H_5)_2NCS_2-)_2.2CBr_4$ at 60° C. under a vacuum of 0.02 mm. of mercury, the yellow, translucent crystals of $$((C_2H_5)_2NCS_2-)_2.2CBr_4$$

gave up carbontetrabromide thus yielding porous white, opaque tetraethylthiuram disulphide (M. P. 70–71° C.) quantitatively. The particles of tetraethylthiuram disulphide possessed the same external size and shape as the crystals of $$((C_2H_5)_2NCS_2-)_2.2CBr_4$$

from which they were derived. In other words, the tetraethylthiuram disulphide was obtained in the form of a pseudomorph after $$((C_2H_5)_2NCS_2-)_2.2CBr_4$$

*Example II*

In a beaker was placed 30 cc. of carbon tetrachloride and 3 g. of tetraethylthiuram disulphide (M. P. 70–71° C.). The mixture was heated with stirring until the tetraethylthiuram disulphide had dissolved completely. On allowing the solution to cool slowly with evaporation of some of the carbon tetrachloride, large, pale yellow, transparent, tabular crystals formed at the surface of the solution. On removing the excess supernatant liquid from some of these crystals by means of a filterpaper and weighing the crystals before and after heating in an oven at 40° C., the loss in weight due to liberation of carbon tetrachloride amounted to 49.7%, the theoretical content of carbon tetrachloride being 51.7% for $((C_2H_5)_2NCS_2-)_2.2CCl_4$.

At room temperature and atmospheric pressure the pale yellow, transparent crystals of $((C_2H_5)_2NCS_2-)_2.2CCl_4$ tended to lose carbon tetrachloride somewhat less rapidly than at 40° C. yielding porous, white, opaque tetraethylthiuram disulphide (M. P. 70–71° C.) quantitatively. The particles of tetraethylthiuram disulphide possessed the same external size and shape as the original crystals of $$((C_2H_5)_2NCS_2-)_2.2CCl_4$$

from which they were derived, the tetraethylthiuram disulphide being thus obtained in the form of a pseudomorph after $$((C_2H_5)_2NCS_2-)_2.2CCl_4$$

A repetition of the above process using 30 cc. of carbon tetrachloride and 10 g. of tetraethylthiuram disulphide gave a practically solid mass of $((C_2H_5)_2NCS_2-)_2.2CCl_4$ crystals which after filtration and drying at 40° C. gave 9.6 g. of porous white, opaque, finely divided pseudomorph of tetraethylthiuram disulphide after $$((C_2H_5)_2NCS_2-)_2.2CCl_4$$

*Example III*

In a 12 l. r.b. flask was placed 6 l. of carbon tetrachloride and 2000 g. of tetraethylthiuram disulphide. The mixture was heated with stirring until a clear solution was obtained. The hot solution was added with rapid stirring to 16 l. of water at 5° C. in order to chill the carbon tetrachloride solution very rapidly and thus form very small crystals of ((C₂H₅)₂NCS₂—)₂.2CCl₄. The product was filtered and dried at 40° C. in an oven thus yielding 1900 g. of soft, white, porous, opaque, finely divided pseudomorph of tetraethylthiuram disulphide after ((C₂H₅)₂NCS₂—)₂.2CCl₄

Microscopic examination indicated a particle size lying between one and six microns.

Example IV

In a 45 l. stainless-steel drum was placed 8 kg. of tetraethylthiuram disulphide, 8 l. of carbon tetrachloride and 16 l. of ethanol. The mixture was heated with stirring until all the tetraethylthiuram disulphide had dissolved. On cooling the mixture for sixteen hours at −10° C. a solid compact mass of crystalline ((C₂H₅)₂NCS₂—)₂.2CCl₄ was formed. After breaking up the crystals by means of a "Lightnin" mixer, and filtering on a large Buchner funnel, the crystals were heated at 40° C. in a current of air for sixteen hours to remove the carbon tetrachloride, thus yielding 7.6 kg. of porous, white, opaque pseudomorph of tetraethylthiuram disulphide after ((C₂H₅)₂NCS₂—)₂.2CCl₄

A similar result was obtained using methanol and isopropanol in place of ethanol.

DISCUSSION OF EXAMPLES

The product from the interaction of tetraethylthiuram disulphide and carbon tetrachloride, ((C₂H₅)₂NCS₂—)₂.2CCl₄, consists of pale yellow, translucent crystals showing a characteristic tabular habit elongated parallel to the "c" crystallographic axis, the clinopinacoid (010) being the dominant form. The crystals invariably show a common orientation, the "b" crystallographic axis being parallel to the axis of the microscope. Such specimens are optically anisotropic and exhibit parallel extinction, positive elongation and moderately low birefringence.

Photographic reproductions are presented on the drawing sheets, in which:

Figure 5 is an orthographic projection of a typical crystal of tetraethylthiuram disulphide.

Figure 6 is an orthographic projection of a typical pseudomorph of tetraethylthiuram disulphide after ((C₂H₅)₂NCS₂—)₂.2CCl₄.

Figure 1:
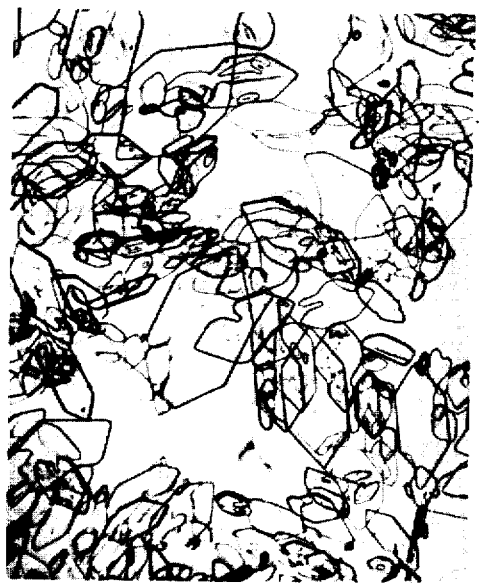
Figure 1 is a photomicrograph of crystals of ((C₂H₅)₂NCS₂—)₂.2CCl₄ on a microscope slide.
Figure 2:
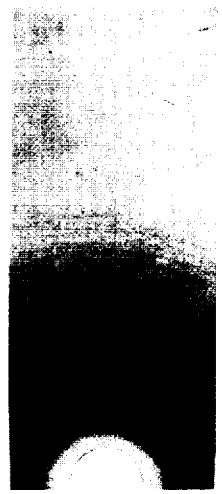
Figure 2 is an X-ray powder pattern of ((C₂H₅)₂NCS₂—)₂.2CCl₄

Figure 1 is a photomicrograph of crystals of ((C₂H₅)₂NCS₂—)₂.2CCl₄ from carbon tetrachloride solution as described in the discussion of the examples. The X-ray powder pattern of ((C₂H₅)₂NCS₂—)₂.2CCl₄ is given in Figure 2, and the principal lines are indicated in Table 1, where "d" refers to the distance between parallel reflecting planes in Angstrom units and I/I₁ is the ratio of the density of a given line to the density of the densest line in the pattern (or the ratio of the intensity of a given reflection to the intensity of the most intense reflection).

TABLE 1.—PRINCIPAL LINES FROM THE X-RAY POWDER PATTERN OF ((C₂H₅)₂NCS₂—)₂.2CCl₄

| d (Å.) | I/I₁ |
|---|---|
| 7.00 | 0.9. |
| 5.90 | 0.6. |
| 5.50 | 0.6. |
| 5.176 | 1.0. |
| 4.60 | weak. |
| 4.31 | Do. |
| 4.10 | 1.0. |
| 3.65 | weak. |
| 2.97 | 0.7. |
| 2.82 | 0.8. |
| 2.74 | weak. |
| 2.61 | Do. |
| 2.46 | Do. |
| 1.965 | 0.7. |

Figure 3:
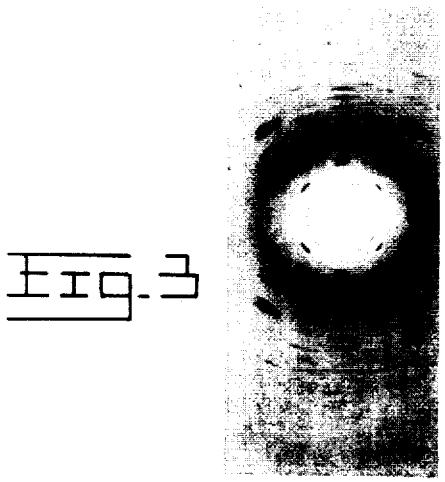
Figure 3 is a single-crystal X-ray pattern of ((C₂H₅)₂NCS₂—)₂.2CCl₄.

A single-crystal X-ray pattern of ((C₂H₅)₂NCS₂—)₂.2CCl₄ is shown in Figure 3, the rotation being about the "a" axis. From the pattern shown in Figure 3 it is possible to deduce that crystals of ((C₂H₅)₂NCS₂—)₂.2CCl₄ belong to the orthorhombic system and that the unit cell dimensions are $a=9.21$Å; $b=10.8$Å; $c=5.97$Å.

When a crystal of pale yellow, translucent ((C₂H₅)₂NCS₂—)₂.2CCl₄ is removed from its reaction medium, it readily loses carbon tetrachloride yielding a porous, white, opaque, solid particle of tetraethylthiuram disulphide with the same external size and shape as the ((C₂H₅)₂NCS₂—)₂.2CCl₄ from which it was derived. Such tetraethylthiuram disulphide is said to be a pseudomorph after ((C₂H₅)₂NCS₂—)₂.2CCl₄

Figure 4:
Figure 4 is an X-ray powder pattern of pseudomorph of tetraethylthiuram disulphide after ((C₂H₅)₂NCS₂—)₂.2CCl₄.

The X-ray powder pattern of such pseudomorphous tetraethylthiuram disulphide is given in Figure 4 and the principal lines are indicated in Table 2.

TABLE 2.—PRINCIPAL LINES FROM X-RAY POWDER PATTERN OF THE PSEUDOMORPH OF TETRAETHYLTHIURAM DISULPHIDE AFTER ((C₂H₅)₂NCS₂—)₂.2CCl₄

| d (Å.) | I/I₁ | d (Å.) | I/I₁ |
|---|---|---|---|
| 9.10 | 0.4. | 2.98 | 0.4. |
| 7.90 | weak. | 2.90 | 0.3. |
| 7.60 | 0.7. | 2.76 | 0.4. |
| 6.35 | 1.0. | 2.70 | weak. |
| 6.15 | 0.8. | 2.62 | Do. |
| 5.55 | 0.3. | 2.51 | 0.4. |
| 5.25 | weak. | 2.47 | 0.4. |
| 5.10 | 0.7. | 2.43 | weak. |
| 4.78 | weak. | 2.20 | 0.6. |
| 4.54 | Do. | 2.13 | 0.6. |
| 4.31 | Do. | 2.04 | weak. |
| 4.14 | 0.9. | 2.00 | Do. |
| 3.94 | 0.4. | 1.975 | Do. |
| 3.80 | weak. | 1.925 | Do. |
| 3.61 | 0.6. | 1.88 | Do. |
| 3.45 | 0.5. | 1.865 | Do. |
| 3.26 | weak. | 1.70 | 0.5. |
| 3.18 | 0.8. | 1.67 | weak. |
| 3.06 | weak. | | |

Figure 4 indicates that the pseudomorph of tetraethylthiuram disulphide after ((C₂H₅)₂NCS₂—)₂.2CCl₄ is a crystalline substance. Ordinary crystalline tetraethylthiuram disulphide obtained, for example, by crystallization from ethanol yields the same X-ray powder pattern.

Crystallographic data showing some of the differences between ordinary crystalline tetraethylthiuram disulphide and the pseudomorph of tetraethylthiuram disulphide after $$((C_2H_5)_2NCS_2-)_2.2CCl_4$$

are given in Table 3.

TABLE 3.—MORPHOLOGICAL DIFFERENCES BETWEEN ORDINARY CRYSTALLINE TETRAETHYLTHIURAM DISULPHIDE AND THE PSEUDOMORPH OF TETRAETHYLTHIURAM DISULPHIDE AFTER $((C_2H_5)_2NCS_2-)_2.2CCl_4$

| Property | Ordinary Crystalline Tetraethylthiuram Disulphide | Pseudomorph of Tetraethylthiuram Disulphide after $((C_2H_5)_2NCS_2-)_2.2CCl_4$ |
|---|---|---|
| Crystal System | Monoclinic | Orthorhombic. |
| Axial Ratio (goniometry) $a:b:c$ | 0.534:1:0.686 | 0.43:1:0.56. |
| Beta Angle | 92° 30′±10′ | 90°. |
| Form: | | |
| basal pinacoid 001 | present | absent. |
| orthopinacoid 100 | do | Do. |
| clinopinacoid 010 | do | present. |
| prism 110 | rare | Do. |
| pyramid 111 | present | Do. |
| Habit | (a) More or less equidimensional. (b) columnar | tabular. |
| Interfacial Angles (Polar): | | |
| 001 and 100 | 87° 30′±10′ | |
| 010 | 90° 00′±25′ | |
| 110 | | |
| 111 | 54°08′±07′ | |
| 1̄11 | 57°09′±01′ | |
| 100 and 010 | 90° 00′±33′ | |
| 110 | 28° 28′±22′ | |
| 111 | 42° 25′±10′ | |
| 1̄11 | 44° 34′±10′ | |
| 010 and 110 | 61° 40′±15′ | 60° 20′. |
| 111 | 67° 34′±25′ | 73° 20′. |
| 1̄11 | 66° 20′±18′ | |
| 110 and 1̄10 | | 47° 20′. |
| 111 | | |
| 1̄11 | | |
| 111 and 1̄11 | 45° 32′±11′ | 33° 20′. |
| 111 | 92° 56′±14′ | |
| 11̄1 | 68° 44′±08′ | |
| 11̄1 and 1̄11 | 47° 20′±07′ | |

NOTES ON TABLE 3

1. The axial ratio ($a:b:c=0.43:1:0.56$) of the pseudomorph of tetraethylthiuram disulphide after $$((C_2H_5)_2NCS_2-)_2.2CCl_4$$

determined by goniometry closely approximates the ratio of the unit cell dimensions (a=9.21 Å.; b=10.8 Å.; c= 5.97 Å.) of the $((C_2H_5)_2NCS_2-)_2.2CCl_4$ from which it was derived provided the value for the "a" crystallographic axis be doubled.

The axial ratio ($a:b:c=0.534:1:0.686$) of ordinary crystalline tetraethylthiuram disulphide determined by goniometry closely approximates the ratio of the unit cell dimensions ($a=15.4$ Å.; $b=13.7$ Å.; $c=7.8$ Å.) obtained by X-ray diffraction provided the value for the "a" crystallographic axis be doubled.

2. Ordinary crystalline tetraethylthiuram disulphide shows two characteristic habits. Crystals obtained from ethyl acetate or ether are more or less equidimensional with any two of the three pinacoids as the prominent faces. Crystals from methanol, ethanol, isopropanol and hexane show a columnar habit elongated in a zone containing the clinopinacoid (010) and one set of hemibipyramids (e. g. 11̄1, 1̄11, 1̄11 and 111̄).

3. The pseudomorph of tetraethylthiuram disulphide after $((C_2H_5)_2NCS_2-)_2.2CCl_4$ shows a characteristic tabular habit elongated parallel to the "c" crystallographic axis and with the clinopinacoid as the dominant form.

4. The interfacial angles measured on the pseudomorph are correct only to the nearest degree.

Orthographic projections of a typical crystal of tetraethylthiuram disulphide and a pseudomorph of tetraethylthiuram disulphide after $$((C_2H_5)_2NCS_2-)_2.2CCl_4$$

are given in Figures 5 and 6, respectively. These represent "ideal" crystals with equal development of the common faces. The very rare prism (110) in the case of ordinary crystalline tetraethylthiuram disulphide is not shown in Figure 5.

The applicants have described the invention in suitable terms to enable one skilled in the art to carry it out. It will be understood that various modifications can be made within its spirit and that the description is illustrative only.

We claim:

1. A new composition of matter having the general empirical formula $((C_2H_5)_2NCS_2-)_2.2CX_4$ wherein X is halogen.

2. A process for the manufacture of pseudomorphous tetraethylthiuram disulphide comprising heating to reaction temperature a mixture of crystalline tetraethylthiuram disulphide with a carbon tetrahalide to form a complex consisting of one molecule of tetraethylthiuram disulphide and two molecules of carbon tetrahalide, decomposing said complex and recovering a pseudomorph after said complex.

3. A process according to claim 2 wherein the carbon tetrahalide is carbon tetrachloride.

4. A process according to claim 2 wherein the carbon tetrahalide is carbon tetrabromide.

5. A process according to claim 2 wherein the reaction is carried out in the presence of a liquid reaction medium inert to the reactants.

6. A process according to claim 2 wherein one mole of tetraethylthiuram disulphide is heated with two moles of carbon tetrahalide to form a homogeneous mixture and the resulting mixture cooled to form said complex.

7. A process according to claim 6 wherein the carbon tetrahalide is removed by the application of heat and vacuum.

8. A new composition of matter having the empirical formula $[(C_2H_5)_2NCS_2-]_2.2CBr_4$.

9. A new composition of matter having the empirical formula $[(C_2H_5)_2NCS_2-]_2.2CCl_4$.

JENS GUNNAR HALD.
INGER GRETE GAD.
SIDNEY ALFRED VINDIN DEANS.

References Cited in the file of this patent

Beilstein, "Handbuch der Organischen Chemie," vol. 4, series 4 (1922), page 122.